(No Model.)
M. F. GUTIERREZ.
PISTON PACKING.
No. 393,556. Patented Nov. 27, 1888.
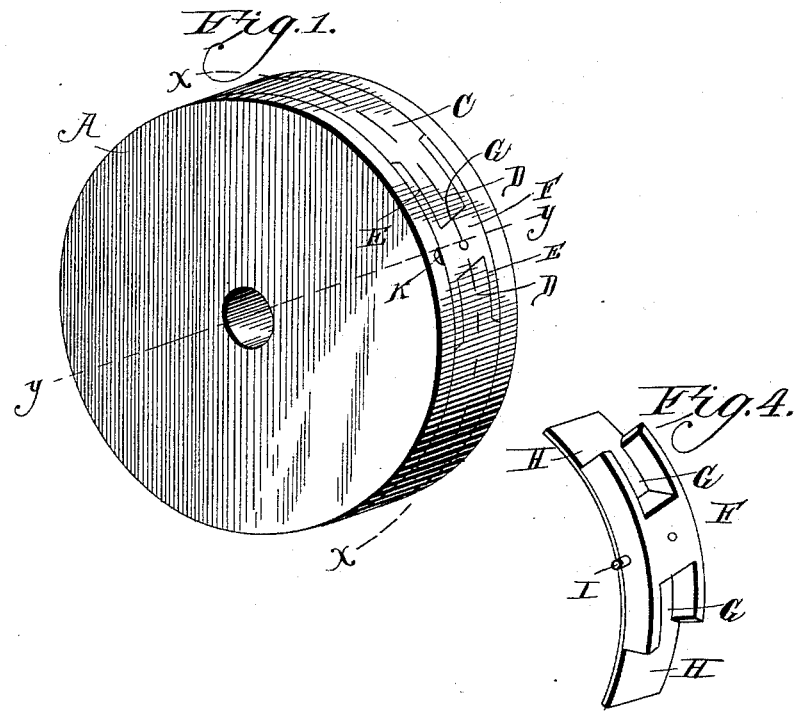
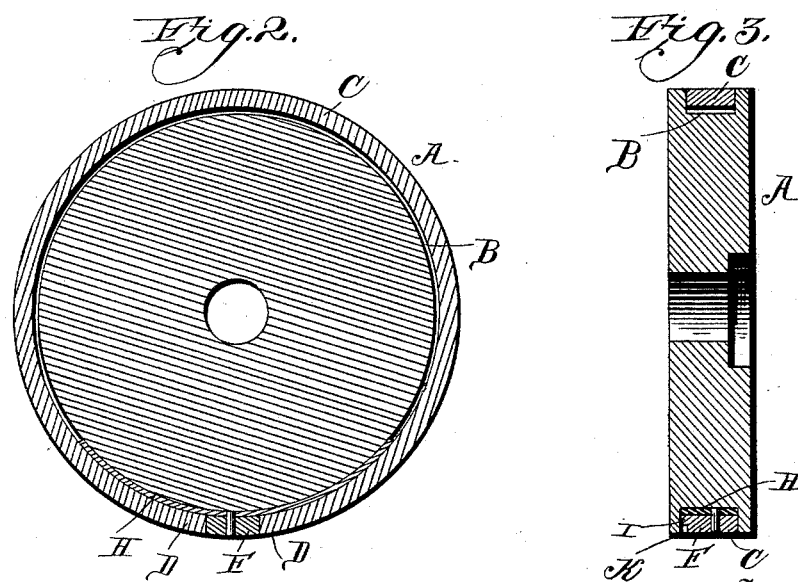
Witnesses
Henry G. Dieterich
J. W. Garner
Inventor
M. F. Gutierrez
By his Attorneys
C. A. Snow & Co.
N. PETERS, Photo-Lithographer, Washington, D. C.

UNITED STATES PATENT OFFICE.

MANUEL FERNANDEZ GUTIERREZ, OF ALTOONA, PENNSYLVANIA.

PISTON-PACKING.

SPECIFICATION forming part of Letters Patent No. 393,556, dated November 27, 1888.

Application filed July 11, 1888. Serial No. 279,614. (No model.)

*To all whom it may concern:*

Be it known that I, MANUEL FERNANDEZ GUTIERREZ, a citizen of the United States, residing at Altoona, in the county of Blair and State of Pennsylvania, have invented a new and useful Improvement in Piston-Packings for Steam-Engines, of which the following is a specification.

My invention relates to an improvement in piston-packing for steam engines; and it consists in the peculiar construction and combination of devices that will be more fully set forth hereinafter, and particularly pointed out in the claim.

In the accompanying drawings, Figure 1 is a perspective view of a piston provided with a packing embodying my improvements. Fig. 2 is a sectional view of the same, taken on the line $x\,x$ of Fig. 1. Fig. 3 is a sectional view taken on the line $y\,y$ of Fig. 1. Fig. 4 is a detail view of the curved plate.

A represents the piston-head, which is provided in its periphery with an annular groove, B.

C represents a packing-ring, which is made of brass or other suitable material, and is adapted to fit in the groove B, and is open on one side and has its ends D provided on opposite sides with recesses E of varying lengths. The opposite ends of the open packing-ring are beveled and arranged parallel, as shown. The interior diameter of the packing-ring is somewhat greater than that of the piston-head between opposite sides of the groove, so that an annular space is left between the said ring and the said groove.

F represents a curved plate, which forms an arc of the same radius as the open ring C, and is provided at its ends with open slots G, which are adapted to receive the ends D of the open ring and of the rabbeted or lapped joints therewith. The inner ends of the slots are oblique or beveled to correspond with the ends of the ring C, and thereby enable the said ends of the rings to effect a tight joint with the plate F. Secured to the upper side of the plate, at the center thereof, is a curved spring or liner, H, which is flat, as shown, and is adapted to bear in the groove B in the lower side of the piston-head. The function of this spring or liner is to fill the space between the lower side of the packing-ring and the lower side of the groove B, and thereby maintain the packing-ring in a position concentric with the piston-head. This, together with the inherent resilience of the open packing-ring C, and the fact that the diameter of the latter is slightly in excess of the exterior diameter of the piston-head, causes the piston to be at all times snugly packed in the cylinder. By means of the lapped joints between the plate F and the ends of the rings steam is prevented from leaking between said plate and the ends of said rings.

In one side of the plate F, at the center thereof, is a projecting stud or pin, I, which engages a radial groove, K, which is in one side of the annular groove B. The function of this pin or stud and of the groove K is to prevent the plate F and the packing-ring from moving around the perimeter of the piston.

Other configurations than those described hereinbefore, and shown in the drawings, may be given to the ends of the packing-ring and the open slots in the ends of the plate F without impairing the efficiency of the device or departing from the spirit of my invention, and I therefore do not wish to limit myself to this particular.

A piston-packing thus constructed is extremely cheap and simple, is very strong and durable, and will be found exceedingly efficient.

Having thus described my invention, I claim—

The combination of the piston having the peripheral groove B, provided in one side with the radial groove K, the divided packing-ring C, fitting in said groove and of a larger internal diameter than the diameter of the piston between opposite sides of the groove, the said ring C having its ends parallel and beveled and provided on their sides with longitudinal recesses E, the plate F, curved on an arc of the same radius as the ring C, and having open slots G in its ends, thereby forming tongues adapted to fit in the recesses E, the ends of the slots being beveled to engage the beveled ends of the ring C, the pin I, projecting laterally from said plate F and engaging the groove K, and the liner H, secured to the concave side of the plate F, and having its ends projecting beyond the ends of the said plate and engaging under the ends of the divided ring, as specified.

In testimony that I claim the foregoing as my own I have hereto affixed my signature in presence of two witnesses.

MANUEL FERNANDEZ GUTIERREZ.

Witnesses:
 JAMES E. CURRY,
 HERMAN L. DELO.